United States Patent Office 2,713,218
Patented July 19, 1955

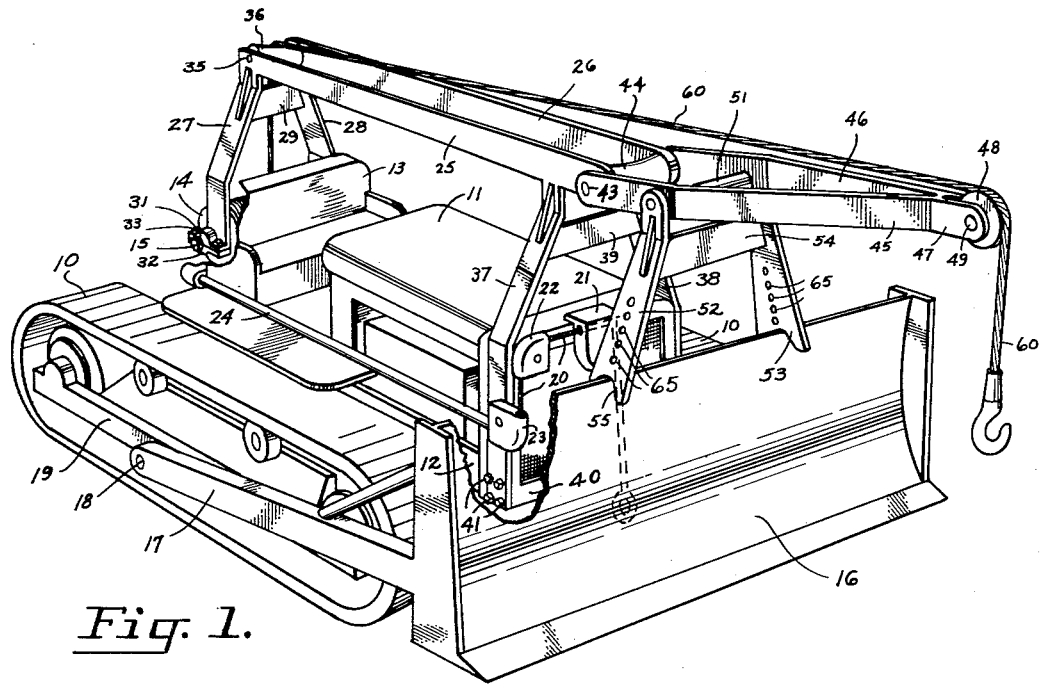

2,713,218

BULLDOZER AND BOOM ATTACHMENT THEREFOR

Charles E. Dyer, Seaside, Oreg.

Application June 8, 1954, Serial No. 435,180

1 Claim. (Cl. 37—117.5)

This invention pertains to equipment for moving and lifting heavy materials, and relates particularly to a boom attachment for tractors, bulldozers and the like.

The logging industry depends heavily upon the use of tractors, with and without bulldozer blades, for grading, clearing and hauling operations. Cranes are also employed in the hauling and lifting of logs, but their use represents considerable expense, not only in the initial cost of equipment but also in transportation to and from the logging site and in maintenance and repair.

It is a principle object of the present invention to provide a boom assembly which is readily attachable to tractors of conventional construction, whereby to provide the functions of a crane without the attending disadvantages enumerated above.

It is another important object of this invention to provide a boom attachment for tractors, which boom is readily adjustable to varying degrees of height for most convenient operation.

A further important object of this invention is the provision of a boom attachment for tractors having a bulldozer blade, which boom attachment is cooperatively engaged with the bulldozer blade whereby the latter functions to adjust the vertical position of the boom.

Still another object of this invention is to provide a boom attachment for tractors, which boom assembly is constructed to utilize the power winch normally provided on the tractor.

Still another object of this invention is the provision of a boom attachment which is of simplified construction for economical manufacture and which is readily attachable to and detachable from the tractor.

The foregoing and other objects and advantages of the present invention will appear from the following detailed description taken in connection with the accompanying drawing, in which:

Figure 1 is a perspective view of a tractor having a bulldozer blade attachment and showing mounted thereon a boom attachment embodying the features of the present invention, parts thereof being broken away to disclose details of construction; and Figure 2 is a perspective view of a tractor without a bulldozer blade attachment and showing mounted on the tractor a modified form of boom attachment embodying features of the present invention.

Referring to the drawing, there is shown a conventional tractor which includes the crawler tracks 10 driven by a motor contained within the housing 11 supported upon a chassis frame 12. The tractor is driven from the operator's seat 13, which is positioned rearwardly of the motor housing and forwardly of a winch drum 14 which is mounted for rotation on stub shafts 15 supported upon the frame. The winch drum is driven by means of the conventional power take-off unit (not shown) generally provided at the rearward end of the tractor.

In the tractor assembly shown in Figure 1, a bulldozer blade 16 is pivotally attached by means of arms 17 and pivot pins 18 to the structural members 19 supported between the front and rear axles of the track wheels. The bulldozer blade is adjustable vertically by means of cable 20 which is secured at one end to the bulldozer blade and fed over pulleys, such as 21, 22, 23, and through conduit 24 to a power driven winch (not shown) located at the rear of the tractor below the winch drum 14. The foregoing is conventional construction, and forms no part of the present invention.

The boom attachment of the present invention includes a structural U-shaped framework, the spaced legs of which are adapted to be secured to the front and rear ends of the tractor and the connecting member of which is adapted to extend above and in the longitudinal direction of the tractor. In the drawing, this framework is shown to include a pair of laterally spaced longitudinal members 25, 26, supported in elevated position by means of end frames. The rearward end frame includes the pair of members 27, 28, which are secured together in spaced relation by such means as the connecting brace 29.

The bottom ends of members 27, 28 are flared outwardly to span the length of the winch drum 14, and means is provided for mounting these bottom ends on the stub shafts 15. In the construction illustrated, this means comprises a split clamp having top and bottom sections 31, 32, respectively. The top section 31 of each clamp is secured, as by welding, to the bottom end of the frame members 27 and 28 and projects laterally outwardly therefrom. Thus, these top sections rest upon the stub shafts 15 and are secured thereto by means of bolts 33, which function to draw the two sections of each clamp together.

The upper ends of the rearward frame members 27, 28 receive a transverse shaft 35 upon which is mounted a roller 36 which extends between the frame sections.

The forward frame member is similar in general construction, comprising the laterally spaced members 37, 38 which are secured together by means of brace 39. The lower ends of the spaced members 37, 38 abut against the side of the structural framework 40 surrounding the forward end of the motor housing 11, and are secured thereto by such means as the bolts 41.

The longitudinal frame members 25, 26 extend forwardly beyond the forward frame assembly 37, 38 and support the pin 43 which extends transversely thereof. A roller 44 is mounted upon the pin 43 for rotation between the spaced members 25, 26.

A boom frame, comprising the structural members 45, 46, is adapted for pivotal attachment to the frame structure described hereinbefore. The members 45, 46 are joined together at their forward ends, terminating in a bifurcated section 47, which carries a roller 48 mounted for rotation on pin 49. The pin is supported by the spaced arms of the bifurcated section. The rearward end of the members 45, 46 are spaced apart and mounted pivotally on the transverse pin 43 which is supported by the forward extensions of members 25, 26.

Intermediate the ends of the boom members 45, 46 there is mounted a transverse shaft 51. A support frame is mounted pivotally on this shaft and comprises the spaced members 52, 53 secured together by means of the transverse brace 54. The upper ends of the members 52, 53 are perforated for mounting on the shaft 51, and the lower ends of these members are preferably provided with indentures 55 which function to stabilize the frame members 52, 53 in contact with the upper edge of the bulldozer blade 16, as shown.

From the foregoing it is apparent that the operation of the boom attachment utilizes the bulldozer blade 16 as a support. The angle of elevation of the boom is readily adjusted by varying the vertical position of the bulldozer blade, in the manner explained hereinbefore.

Moreover, this angular position of the boom may be changed at will during hauling or lifting of a load connected to the cable 60. The cable extends rearwardly over rollers 48 and 36, and also over roller 44 when the boom is lowered, and is reeved about the winch drum 14.

The boom attachment of the present invention is also adaptable for use on tractors which are not provided wth the bulldozer blade shown in Figure 1. Thus, referring to Figure 2, the modification involves the provision of a pair of braces 62, 63, which are secured at their lower ends to the structural framework 40 by means of the bolts 41. In order to provide for the limited pivotal movement of the braces 62, 63 required to permit angular adjustment of the boom, three of the four holes in the bottom ends of the braces are preferably made arcuate, as indicated at 64, about the fourth hole as a pivot center.

The braces 62, 63 project obliquely upward and converge toward each other at substantially the same angle as the members 52, 53. The braces 62, 63 and the corresponding members 52, 53 are provided with a plurality of spaced openings 65 which are arranged for mutual registration to receive securing bolts 66 therethrough. Thus, the angular elevation of the boom may be adjusted within limits by proper selection of registering openings, in the manner described.

It is believed to be apparent that the present invention provides a boom attachment of simplified but rugged construction, which is versatile in its application to tractors of various types and which presents no obstacles to the proper operation of the tractor. The boom assembly is readily attachable to a tractor, requiring only the manipulation of the clamps 31, 32 and the bolts 41 and 66.

It will be apparent to those skilled in the art that various details of construction described hereinbefore may be changed without departing from the scope and spirit of the present invention. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

A boom attachment for a tractor having at its rearward end a power driven boom cable winch and a power driven vertically movable bulldozer blade at the forward end thereof, said boom attachment comprising a substantially U-shaped structural support, the spaced ends of which are adapted to be secured detachably to the forward and rearward ends respectively of a tractor with the intermediate section of the support extending above and longitudinally of the tractor, a boom member mounted pivotally on the intermediate section of the support for rotation on an axis parallel to the plane of movement of the bulldozer blade, a brace member mounted pivotally at its upper end on the boom member forwardly of the boom pivot, boom cable guide roller means mounted on the forward end of the boom member and on the rearward elevated end of the structural support for guiding a boom cable adapted to extend thereover from the boom cable winch, and spaced projections depending from the lower end of the brace mmber and adapted freely to straddle the upper edge of the bulldozer blade for relative rotational displacement between said brace member and blade, whereby to support the boom member freely on the bulldozer blade and to adjust the angular position of the boom member by vertical movement of the bulldozer blade.

References Cited in the file of this patent

UNITED STATES PATENTS

| | | |
|---|---|---|
| 2,215,025 | Austin | Sept. 17, 1940 |
| 2,446,220 | Erdahl | Aug. 3, 1948 |
| 2,502,681 | Swanson | Apr. 4, 1950 |
| 2,660,816 | Maxwell | Dec. 1, 1953 |

FOREIGN PATENTS

| | | |
|---|---|---|
| 601,331 | Great Britain | May 4, 1948 |